United States Patent
Ye et al.

(10) Patent No.: US 6,664,542 B2
(45) Date of Patent: Dec. 16, 2003

(54) GAMMA CAMERA ERROR CORRECTION USING MULTIPLE POINT SOURCES

(75) Inventors: Jinghan Ye, Fremont, CA (US); Lingxiong Shao, Saratoga, CA (US); Mary K. Durbin, San Jose, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 18 days.

(21) Appl. No.: 10/026,381

(22) Filed: Dec. 20, 2001

(65) Prior Publication Data

US 2003/0116712 A1 Jun. 26, 2003

(51) Int. Cl.[7] .............................................. G01T 1/166
(52) U.S. Cl. ............................. 250/363.04; 250/363.07
(58) Field of Search ........................ 250/363.04, 252.1, 250/363.07

(56) References Cited

U.S. PATENT DOCUMENTS

| | | | | |
|---|---|---|---|---|
| 4,212,061 A | * | 7/1980 | Knoll et al. | 250/363.07 |
| 4,582,995 A | * | 4/1986 | Lim et al. | 250/363.07 |
| 4,771,177 A | * | 9/1988 | Brown | 250/363.09 |
| 5,173,608 A | | 12/1992 | Motomura et al. | |
| 5,448,073 A | * | 9/1995 | Jeanguillaume | 250/363.02 |
| 5,461,232 A | * | 10/1995 | McCandless et al. | 250/363.04 |
| 5,689,116 A | * | 11/1997 | Heukensfeldt Jansen | 250/363.09 |
| 5,998,793 A | * | 12/1999 | Shao et al. | 250/369 |
| 6,177,675 B1 | * | 1/2001 | Gagnon et al. | 250/363.1 |
| 6,388,244 B1 | * | 5/2002 | Gagnon | 250/208.1 |
| 6,452,164 B1 | * | 9/2002 | Andarawis et al. | 250/252.1 |

\* cited by examiner

*Primary Examiner*—Diego Gutierrez
*Assistant Examiner*—Tania C. Courson
(74) *Attorney, Agent, or Firm*—Eugene E. Clair, Esq.

(57) ABSTRACT

A gamma camera system and method are described which use multiple point sources to detect inaccuracies in detector translational and rotational alignment. In practice of the method of the preferred embodiment, three capillary tubes, each containing a drop of an isotope, are located in different planes and locations with respect to the axis of rotation of the detectors. A SPECT acquisition is performed and the point source projection data is processed to calculate the point source coordinates, from which center-of-rotation correction factors may be calculated. These correction factors are applied by mechanical and software adjustments to the gantry and acquisition systems of the camera to correct for both translational and rotational inaccuracies.

16 Claims, 5 Drawing Sheets

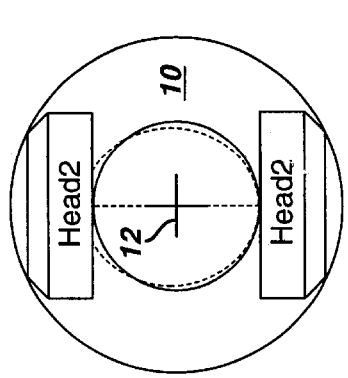
FIG. 1a
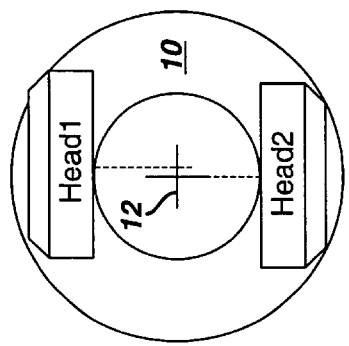
FIG. 1b
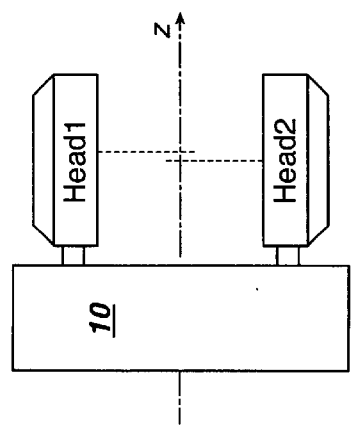
FIG. 1c
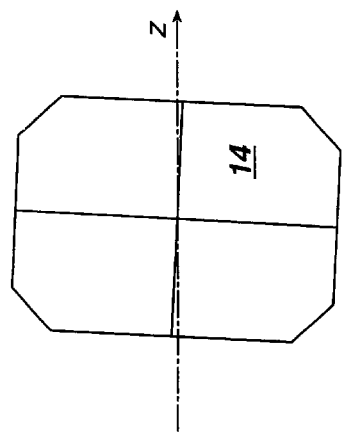
FIG. 1d
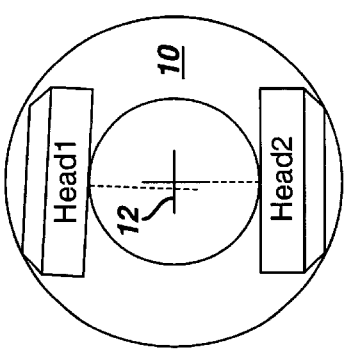
FIG. 1e
FIG. 1f

GAMMA CAMERA ERROR CORRECTION USING MULTIPLE POINT SOURCES

This invention relates to nuclear medicine and, in particular, to the correction of spatial errors in gamma camera alignment by the use of multiple point sources.

Alignment of the image matrix system (the imaging coordinates) with the mechanical system (the detector coordinates) of a nuclear camera is one of the key factors that affect the SPECT image quality. Misalignment of these coordinates can result in spatial errors in the identified locations of radionuclide events, causing lack of clarity in the reconstructed nuclear image. There are potentially three translation errors and three rotation errors that a gamma camera detector may encounter during an event acquisition relative to its correct position. The translation errors are in tangential, axial and radial directions of camera gantry rotation. The rotation axes of the rotation errors are parallel respectively to the tangential, axial and radial directions of gantry rotation.

Currently a single point source measurement method is used in the clinical environment to align the detector head or heads on the gantry. In this method a small radionuclide sample which approximates a point source is placed at an off-axis position in the camera's field-of-view, and a circular SPECT acquisition is acquired. The center of the spot formed by the point source on each frame in the projection is estimated as the center of mass (centroid) of the whole frame. The spatial coordinates of the point source in a transverse direction are then estimated by fitting the centers of the spots on the frames to a sine curve. The spatial coordinate of the point source in the axial direction is estimated as the average of the center position in that direction. The translation errors in the tangential and axial directions for each frame position are calculated based on the estimated point source position.

When there are no rotational errors in the system, the single point source method is relatively accurate. However, when rotational errors become significant, an error correction method that can detect rotational errors as well as the translational errors is highly desirable.

In accordance with the principles of the present invention, a method for detecting and correcting nuclear medicine camera alignment problems or center-of-rotation (COR) errors is described. The inventive method employs multiple point sources in the field-of-view in order to estimate alignment errors. In a preferred embodiment three or more point sources are used. Preferably, the point sources are positioned so that no two sources share the same transverse plane; and no three sources share an oblique plane parallel to the rotation axis. In one embodiment a SPECT acquisition is performed with the multiple point sources in the field-of-view and system alignment information is extracted from the projection data. In a preferred embodiment the method extracts the center of the spot that each point source forms on the frame at a certain detector rotation angle using Gaussian surface fitting. The spatial coordinates of the point sources are found by fitting the centers to a sine curve in transverse directions or a constant in the axial direction. The two translational and three rotational alignment errors are found at each detector position using a least squared fit based on analysis of the imaging system geometry. The preferred method not only measures tangential and axial translation errors of a detector, but also measures all three rotational errors from a single SPECT acquisition of multiple point sources.

In the drawings:

FIGS. 1*a*–1*f* illustrate the types of misalignment of center-of-rotation (COR) errors that may be encountered with a two-detector-head gamma camera;

FIG. 2 illustrates the preparation of a point source sample;

FIGS. 3*a* and 3*b* illustrate the placement of the point sources in the field-of-view;

There are a number of misalignment or COR errors that can develop in a gamma camera, as illustrated in FIGS. 1*a*–1*f*. In these drawings two detectors heads, Head1 and Head2, are mounted for rotation by a gantry 10 about a center-of-rotation indicated by crosshair 12 which is coincident with the z axis. The detector heads can become misaligned in the axial direction as indicated by the misalignment of the dotted lines extending from the centers of the two detector heads in FIG. 1*a*. The detector heads can become misaligned in the tangential direction as indicated by the lack of alignment of the dotted lines extending from the centers of the two detector heads in FIG. 1*b*. Ideally, both dotted lines should intersect the z axis at the center of the crosshair 12. FIG. 1*c* illustrates a radius error by the non-circular dotted line, indicating that the two detector heads are not following the identical concentric path when rotated by the gantry about the center of the crosshair 12. In FIG. 1*d* the detector surface of the Head1 detector is not parallel to the z axis of rotation, referred to herein as a "tilt error." In FIG. 1*e* there is a rotation error of the Head1 detector; the axis of rotation of Head1 is misaligned in this example. This type of error is referred to as an "angle error." FIG. 1*f* is a plan view of the detector surface 14 in which the detector head is rotated from its orthogonal alignment with the z axis, referred to herein as a "twist error." The prior art approaches address only the translation errors of FIGS. 1*a* and 1*b*, and assume that the misalignment is constant for each angle setting of the detector heads.

The method of the present invention can be performed by mounting or suspending point sources in the field-of-view of a gamma camera as described more fully below. An acquisition sequence is then performed in which the detector head(s) are rotated about the COR by the gantry and gamma rays detected at each detector location. In a constructed embodiment there may by 64–128 such detector locations. The locations of the point sources in the field-of-view are detected from the gamma ray counts on the crystals and the position and angle of locational shifts of the point sources at different detector positions are measured. In a preferred embodiment these point source measurements are analyzed by a least squares approximation method to resolve the errors at each detector location. The detected errors are corrected by either mechanical adjustment of the head rotation or by correction factors in the reconstruction algorithms. For instance, the x,y coordinates of detected gamma ray events on the crystal can be corrected to x+$\Delta$x, y+$\Delta$y. Preferably these corrections are done on-the-fly during acquisition to correct locational shifts as the event data is acquired. An average correction value can be applied, but preferably event-by-event correction values are used.

Figure 2:
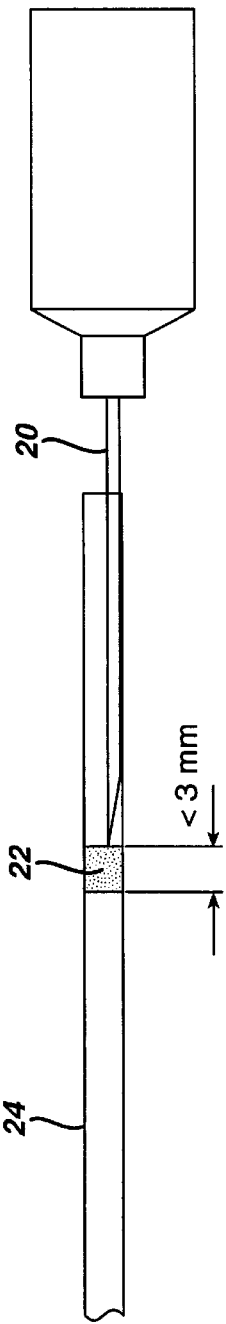

A point source can be prepared as shown in FIG. 2. A syringe 20 is used to put a tiny drop 22 of a radionuclide in a capillary tube 24. As shown in the drawing, to approximate a point source in the typical camera image field, it is desirable to keep the size of the drop to 4 mm or less, and preferably less than 3 mm in all dimensions. A suitable radionuclide for many cameras is technetium (Tc-99m) with an activity level of 100 $\mu$Ci or greater, and preferably in the range of 500 to 1000 $\mu$Ci. A point source is easy and inexpensive to produce in this manner and can be properly disposed of relatively easily.

Figure 3A:
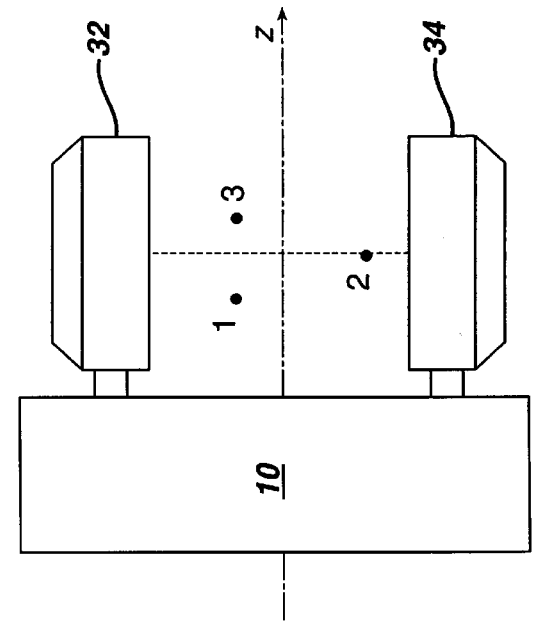
Figure 3B:
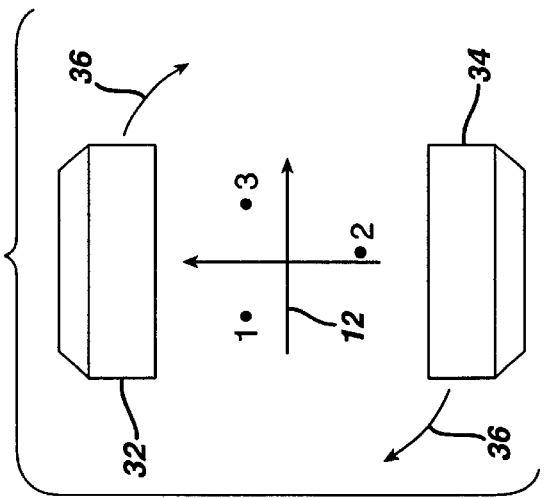

FIGS. 3a and 3b are axial and side views of an example of effective placement of the point sources 1, 2, and 3 in the field-of-view between camera detector heads 32 and 34. The arrows 36 indicate the direction of rotation of the detector heads during acquisition. The crosshairs 12 mark the center of the x,y coordinates of the system, which also intersect the z axis of rotation. In the illustrated point source placement the sources 1, 2, 3 are seen by both detectors at every angle during the rotational ECT scan. None of the sources shares a transverse plane, that is, each source has its own unique z value. Preferably the z coordinates of the sources are separated by at least 10 cm and the sources are placed about 10 cm from the z axis of rotation in this embodiment. Preferably, the sources are distributed approximately evenly in space when viewed axially.

In a preferred method of the present invention a 360-degree SPECT study is performed with the point sources in the field-of-view using the largest matrix available. The number of stops should be 64 or greater. The result for each head is saved as a separate study.

Figure 4:
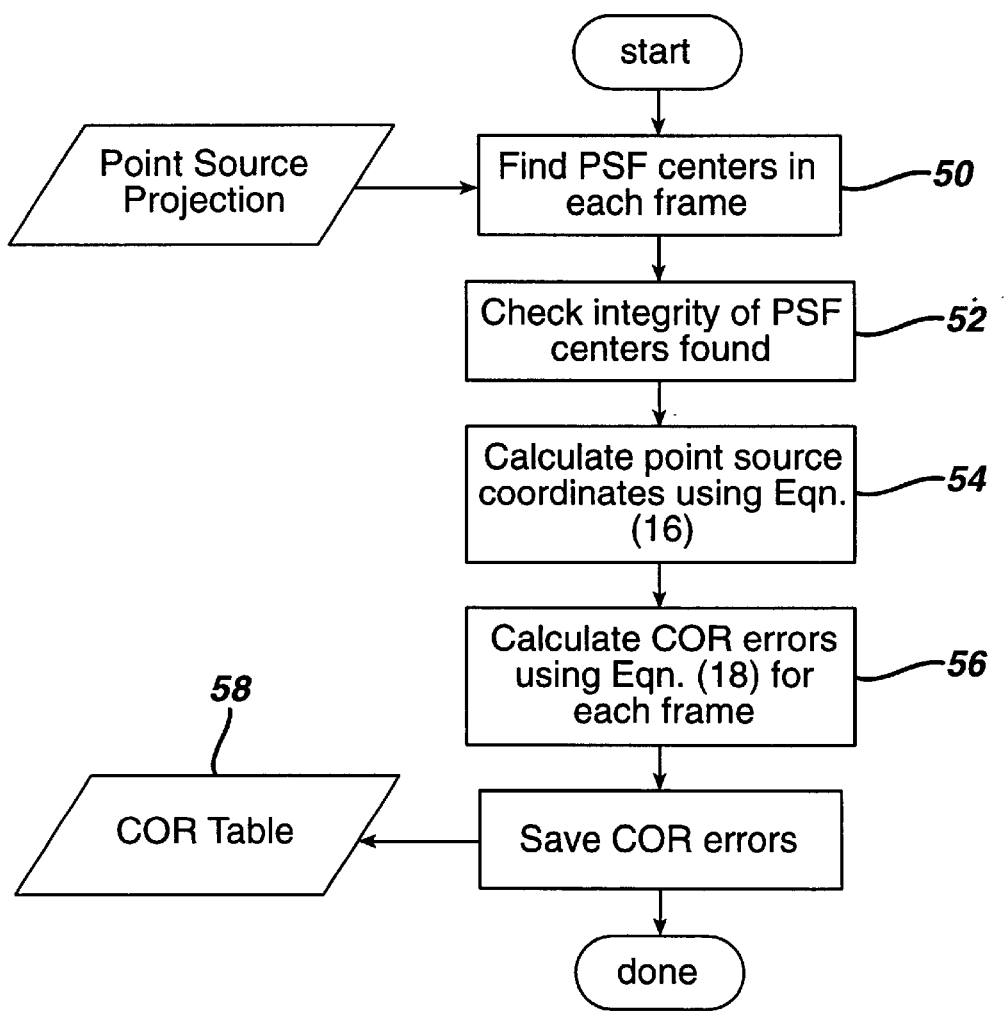
FIG. 4 is a flowchart of a method for determining the COR values for a detector head from its point source projection.
Figure 5:
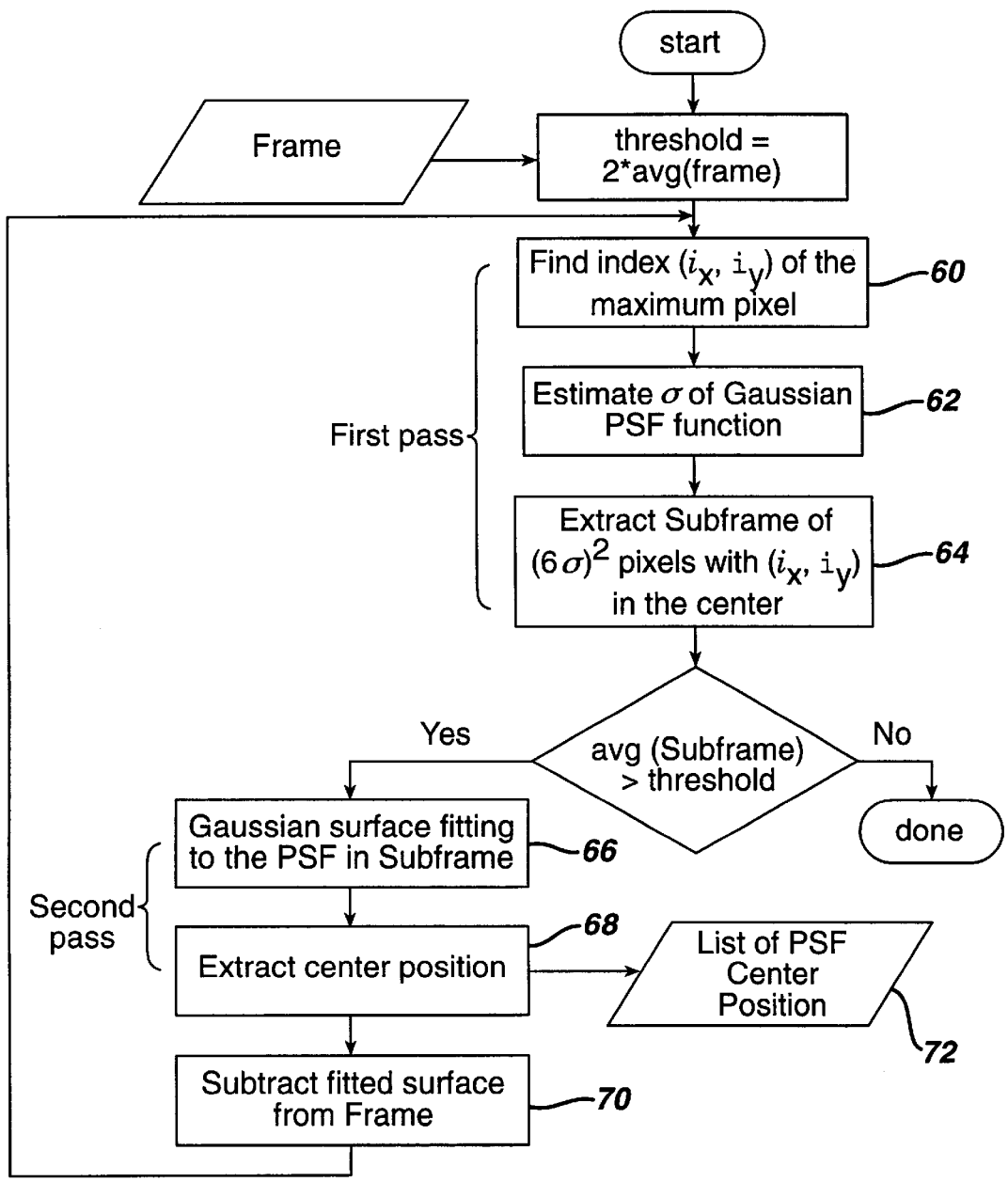
FIG. 5 is a flowchart of a method for determining the centers of a point source projection in a frame.

The alignment errors for each detector head are determined based on the measured point source projection data. A flowchart illustrating this procedure is shown in FIG. 4. From the point source projection data the projection center of each point source (PSF) is determined (step 50). A two-dimensional (2D) Gaussian surface fit program can be used to determine the projection center of each point source at each detector position. Using a 2D Gaussian surface fit can minimize the error in center determination due to asymmetry of the peak when the projection of a point source is close to an edge of the detector. FIG. 7 shows a flowchart of this procedure. The center of a point source projection, i.e., a peak, is accurately determined by two passes. First the approximate center is found by searching the position of the maximum pixel (step 60). Assuming this is roughly the center of a peak, a rough estimation of the sigma ($\sigma$) of the peak is determined (step 62). A square subset of the frame with the maximum intensity pixel at the center and of 6$\sigma$ in size is extracted from the frame for the next pass, that is, the surface fit (step 64). Using $\sigma$ and the position of the maximum pixel as the initial values, the 2D Gaussian surface fit program determines the accurate center of the peak from the extracted sub-frame (steps 66, 68). To find the center of the next peak, the surface fit of the current peak is subtracted from the frame before looping back to the first pass of the peak-searching program (step 70). The peak-searching program generates a list of point source projection centers found from each frame (72).

Figure 6:
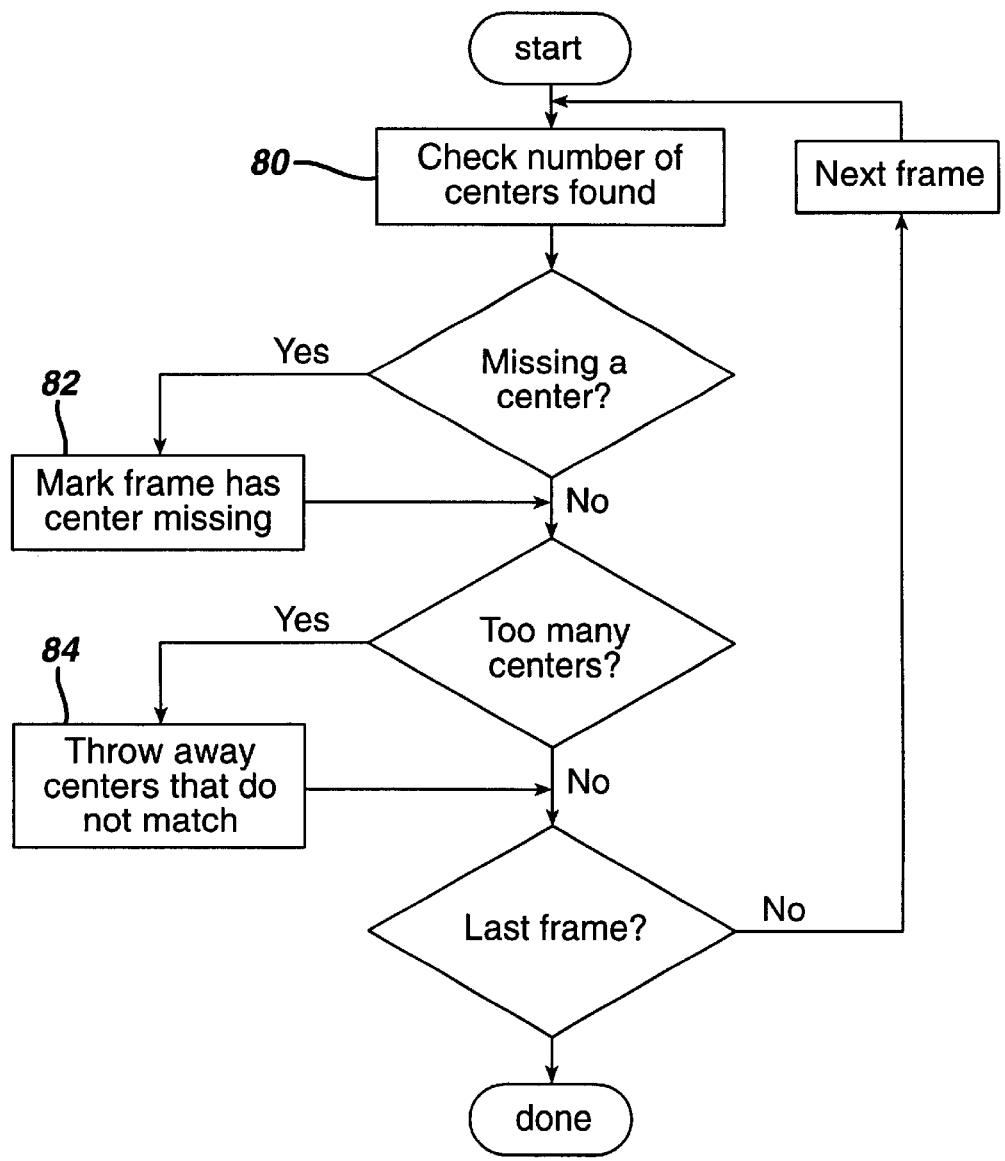
FIG. 6 is a flowchart of a method for checking the integrity of a number of point projections in a frame.

After the point source centers are found for the last frame, the integrity of number of source points found in all the frames is checked (step 52). FIG. 6 shows a flowchart of this procedure. A check is performed of the number of centers found in a frame (step 80). If there is a points missing for a frame, it may be an indication that either the point projection is outside the field-of-view or the source is too weak or the acquisition time is too short. If the frame is missing a center it is marked (step 82). If there are more points found in a frame, it may be due to high noise level in the acquisition. Weak point sources or short acquisition times are likely causes of the high noise level. Centers that do not match points in other frames are discarded (step 84). The procedure is continued until all frames have been checked.

After the point source projection centers are found for all the frames, the coordinates of the point sources can be determined using Equation (16) found in the Appendix below (step 54). The center-of-rotation alignment errors for each frame can be determined using Equation (18) of the Appendix (step 56). The alignment errors are stored in a table of rotational alignment data (Step 58).

The alignment errors which have been determined are then used to correct the alignment geometry, either through mechanical adjustment to the gantry or correction factors in the processing software. In one typical embodiment, the translation errors $E_t$ and $E_s$ were corrected in the acquisition software. The detector angle error scan be corrected with control mechanisms in the detector head mounts. Rotational errors $\zeta$ and $\xi$ are preferably adjusted mechanically by trained service personnel.

Appendix

The equations shown below are based upon two coordinate systems, one of spatial coordinates and the other of coordinates of the detector of the gamma camera. These are defined as follows:

Spatial coordinates include x-, y- and z-axis. When a patient is in a head-in, supine position on the patient table, the x-axis points horizontally to the left of the patient; the y-axis points upright; the z-axis points horizontally to the feet of the patient. The origin of the spatial coordinate system is fixed relative to the patient table.

Detector coordinates include t-, s-axis and detector angle. When a patient is in a head-in position on the table, and is viewed from the feet of the patient, 12 o'clock is the 0 degree of the detector rotation angle and clockwise rotation is positive. When a detector head is at 0-degree position, the t-axis of the detector is parallel to the x-axis of the spatial coordinates. The s-axis of the detector is always parallel to the z-axis of the spatial coordinates. The t-axis in the detector coordinate system is fixed relative to the detector head.

The distribution of activities is presented in spatial coordinates. The measured projections are presented in detector coordinates.

Ideal Alignment

Assume an ideal point source is positioned at $(x_0, y_0, z_0)$ in the spatial coordinates. The spatial activity distribution can be represented as:

$$A(x,y,z)=\delta(x-x_0, y-y_0, z-z_0) \qquad (1)$$

When this point source is measured with a parallel-beam collimator on a detector, a projection generated in the detector coordinates should be:

$$p(t,s,\theta)=h(t-x_0 \cos \theta + y_0 \sin \theta, s-z_0, R-x_0 \sin \theta - y_0 \cos \theta) \qquad (2)$$

where h (t,s,d) is the point spread function at source-to-collimator distance d, R is the detector radius defined from the collimator surface to the center of rotation.

Assuming that h (t,s,d) is symmetric to the t- and s-axis, the resulting projection would be symmetric to the center of the spot generated by the point source in the detector space.

Therefore the centroid coordinates can be used to represent the projection.

$$\begin{cases} t_0(\theta) = x_0\cos\theta - y_0\sin\theta \\ s_0(\theta) = z_0 \end{cases} \quad (3)$$

Equation (3) can be rewritten as $$\begin{cases} t_0(\theta) = -r_0\sin(\theta - \theta_0) \\ s_0(\theta) = z_0 \end{cases} \quad (4)$$

where $r_0=\sqrt{x_0^2+y_0^2}$ and $\theta_0=tan^{-1}(x_0/y_0)$, or equivalently, $x_0=r_0 \sin\theta_0$ and $y_0 = r_0 \cos\theta_0$.

Translation Error in Axial Direction

When an axial translation error is present, the measured t and s for the point source would be $$\begin{cases} t_a(\theta) = t_0 \\ s_a(\theta) = s_0 - E_s(\theta) \end{cases} \quad (5)$$

where $E_s(\theta)$ is the translation of the detector in the s direction as a function of detector angle $\theta$. A positive $E_s$ causes the detector the shift in the s or z direction, as illustrated by Head1 in FIG. 1a.

Translation Error in Tangential Direction

With a translation error in the tangential direction, we have $$\begin{cases} t_b(\theta) = t_0 - E_t(\theta) \\ s_b(\theta) = s_0 \end{cases} \quad (6)$$

where $E_t(\theta)$ is the translation of the detector in the t direction as a function of detector angle $\theta$. FIG. 1b illustrates a positive $E_t$ of Head1.

Translation Error in Radius Direction

The effect of a translation error in the radius direction is negligible in parallel-beam SPECT studies. This error can be measured and needs to be addressed in fan-beam, cone-beam or MCD geometry systems.

Detector not Parallel to Rotation Axis (Tilt Error)

With tilt errors, we have $$\begin{cases} t_d(\theta) = t_0 \\ s_d(\theta) = s_0\cos\zeta(\theta) + (R - u_0)\sin\zeta(\theta) \end{cases} \quad (7)$$

where $\zeta(\theta)$ is the detector rotation angle relative to the z-axis as a function of detector angle $\theta$ and R is the radius of rotation measured from the collimator surface. $u_0$ is defined as:

$$u_0 = x_0 \sin\theta + y_0 \cos\theta \quad (8)$$

The rotation axis of the tilt error is on the surface of the collimator and is perpendicular to the gantry rotation axis. A positive $\zeta$ causes a positive s on the detector surface to tilt towards the gantry rotation axis. FIG. 1d shows that Head1 has a positive $\zeta$.

Inaccurate Angular Positioning (Angle Error)

With angle errors, we have $$\begin{cases} t_e(\theta) = t_0\cos\varepsilon + (R - u_0)\sin\varepsilon \\ s_e(\theta) = s_0 \end{cases} \quad (9)$$

where $\varepsilon(\theta)$ is the error that causes the detector surface not to be facing the axis of rotation. The rotation axis of the angle error is defined on the surface of the collimator and is parallel to the gantry rotation axis. The direction of $\varepsilon$ defined in the same way as $\theta$. FIG. 1e shows that Head1 has a positive $\varepsilon$.

Detector Rotated Relative to the Norm of the Detector Surface (Twist Error)

With twist errors, we have $$\begin{cases} t_f(\theta) = t_0\cos\xi(\theta) - s_0\sin\xi(\theta) \\ s_f(\theta) = t_0\sin\xi(\theta) + s_0\cos\xi(\theta) \end{cases} \quad (10)$$

where $\xi(\theta)$ is the detector rotation angle relative to the norm of the detector surface as a function of detector angle $\theta$. The rotation axis of twist error is at the center of the detector surface and is perpendicular to the surface. When viewed from the gantry rotation axis towards the detector, a positive twist error causes a clockwise rotation of the detector surface.

The actual measurement should include a combination of all the errors:

$$\begin{cases} t_m = (t_0\cos\varepsilon + (R - u_0)\sin\varepsilon)\cos\xi - \\ \quad (s_0\cos\zeta + (R - u_0)\cos\varepsilon - t_0\sin\varepsilon)\sin\zeta)\sin\xi - E_t \\ s_m = ((t_0\cos\varepsilon + (R - u_0)\sin\varepsilon)\sin\xi + \\ \quad (s_0\cos\zeta + (R - u_0)\cos\varepsilon - t_0\sin\varepsilon)\sin\zeta)\sin\xi - E_s \end{cases} \quad (11)$$

Note that we dropped $\theta$ from the variables that are a function of $\theta$ to shorten the expression.

The task of measuring the misalignments is to determine $E_t(\theta)$, $E_s(\theta)$, $\xi(\theta)$, $\zeta(\theta)$, and $\varepsilon(\theta)$ with measurements that can be performed in a clinical environment.

Estimate the Spatial Coordinates of a Point Source

Assume all the rotation errors are small. The following conditions are true:

$$\sin\varepsilon \cong \varepsilon \quad (12)$$
$$\cos\varepsilon \cong 1$$
$$\sin\zeta \cong \zeta$$
$$\cos\zeta \cong 1$$
$$\sin\xi \cong \xi$$
$$\cos\xi \cong 1$$
$$\sin\varepsilon\sin\zeta \cong 0$$
$$\sin\varepsilon\sin\xi \cong 0$$
$$\sin\zeta\sin\xi \cong 0$$

Equation (10) is simplified to:

$$\begin{cases} t_m \cong t_0 + d_0\varepsilon - s_0\xi - E_t \\ s_m \cong s_0 + d_0\zeta + t_0\xi - E_s \end{cases} \quad (13)$$

where $d_0 = R - u_0$. If we put n point sources in the field of view and find the center $\hat{t}_{mi}$ and $\hat{s}_{mi}$ for each of them at each angle position $\theta$, we can estimate the position of the point sources $(x_i, y_i, z_i)$ by minimizing the least squared error for each point for all angles:

$$P = \sum_{j=0}^{N_p - 1} (\hat{t}_{mj} - x_0\cos\theta_j + y_0\sin\theta_j)^2 + (\hat{s}_{mj} - z_0)^2 \quad (14)$$

where $N_p$ is the number of projection angles, and $\theta_j$ is the projection angle at the projection j. We have $$\frac{\partial P}{\partial x_0} = -2\sum_{j=0}^{N_p-1}(\hat{t}_{mj} - x_0\cos\theta_j + y_0\sin\theta_j)\cos\theta_j = 0 \quad (15)$$

$$\frac{\partial P}{\partial y_0} = 2\sum_{j=0}^{N_p-1}(\hat{t}_{mj} - x_0\cos\theta_j + y_0\sin\theta_j)\sin\theta_j = 0$$

$$\frac{\partial P}{\partial z_0} = 2\sum_{j=0}^{N_p-1}(\hat{s}_{mj} - z_0) = 0$$

Resolving the above equations produces $$x_0 = \frac{\sum_{j=0}^{N_p-1}\cos\theta_j\sin\theta_j \sum_{j=0}^{N_p}\hat{t}_{mj}\sin\theta_j - \sum_{j=0}^{N_p}\sin^2\theta_j \sum_{j=0}^{N_p}\hat{t}_{mj}\cos\theta_j}{\left(\sum_{j=0}^{N_p}\cos\theta_j\sin\theta_j\right)^2 - \sum_{j=0}^{N_p}\sin^2\theta_j \sum_{j=0}^{N_p}\cos^2\theta_j} \quad (16)$$

$$y_0 = \frac{\sum_{j=0}^{N_p-1}\cos^2\theta_j \sum_{j=0}^{N_p}\hat{t}_{mj}\sin\theta_j - \sum_{j=0}^{N_p}\cos\theta_j\sin\theta_j \sum_{j=0}^{N_p}\hat{t}_{mj}\cos\theta_j}{\left(\sum_{j=0}^{N_p}\cos\theta_j\sin\theta_j\right)^2 - \sum_{j=0}^{N_p}\sin^2\theta_j \sum_{j=0}^{N_p}\cos^2\theta_j}$$

$$z_0 = \frac{1}{N_p}\sum_{j=0}^{N_p-1}\hat{s}_{mj}$$

Estimate Alignment Errors at Each Projection Angle

We can then calculate $(t_0, s_0, u_0)$ using Equations (3) and (8) for each point source i $(t_i, s_i, u_i)$. $t_{mi}$ and $s_{mi}$ are then derived from $(t_i, s_i, u_i)$ using Equation (13). The errors can be estimated by minimizing the following $$Q = \sum_{i=0}^{n}(\hat{t}_{mi} - t_{mi})^2 + (\hat{s}_{mi} - s_{mi})^2 \quad (17)$$

where $t_{mi}$ and $s_{mi}$ are derived from $(x_i, y_i, z_i)$ using Equation (13). Therefore we have $$\frac{\partial Q}{\partial \varepsilon} = -2\sum_{i=0}^{n}(\hat{t}_{mi} - t_i - d_i\varepsilon + s_i\xi + E_t)d_i = 0 \quad (18)$$

$$\frac{\partial Q}{\partial \xi} = 2\sum_{i=0}^{n}[(\hat{t}_{mi} - t_i - d_i\varepsilon + s_i\xi + E_t)s_i + (\hat{s}_{mi} - s_i - d_i\zeta + t_i\xi + E_s)t_i] = 0$$

$$\frac{\partial Q}{\partial E_t} = 2\sum_{i=0}^{n}(\hat{t}_{mi} - t_i - d_i\varepsilon + s_i\xi + E_t) = 0$$

$$\frac{\partial Q}{\partial \zeta} = -2\sum_{i=0}^{n}(\hat{s}_{mi} - s_i - d_i\zeta + t_i\xi + E_s)d_i = 0$$

$$\frac{\partial Q}{\partial E_s} = 2\sum_{i=0}^{n}(\hat{s}_{mi} - s_i - d_i\zeta + t_i\xi + E_s) = 0$$

It is straightforward to resolve the above linear equations and determine $E_t$, $E_s$, $\xi$, $\zeta$, and $\varepsilon$ for each angle $\theta$. While these equations are optimized for parallel-beam geometry, similar equations can be readily derived in the same manner for fan-beam, cone-beam and coincidence mode geometries.

What is claimed is:

1. A method for adjusting the accuracy of detected event locations in a gamma camera system comprising:
    positioning a plurality of point sources in the field-of-view of the camera;
    acquiring event data from the point sources from a plurality of detector positions;
    processing the event data to produce translational and rotational alignment adjustments; and
    producing gamma camera image information adjusted in accordance with the translational and rotational alignment adjustments.

2. The method of claim 1, wherein positioning comprises positioning three point sources in the field-of-view of the camera.

3. The method of claim 1, wherein positioning comprises positioning three capillary tubes each containing a radionuclide sample in the field-of-view of the camera.

4. The method of claim 1, wherein processing comprises processing the event data to produce a translational adjustment in at least one of an axial direction and a tangential direction, and to produce a rotational adjustment for at least one of a tilt error, an angle error, or a twist error.

5. The method of claim 1, wherein positioning comprises positioning a plurality of point sources in the field-of-view of the camera so that no two point sources share the same transverse plane and no three sources share an oblique plane parallel to the axis of rotation.

6. The method of claim 1, wherein acquiring comprises performing a SPECT acquisition to produce point source projection data for a plurality of detector positions.

7. The method of claim 1, wherein processing comprises extracting the center of each point source in a frame by Gaussian surface fitting.

8. The method of claim 7, wherein processing further comprises determining the spatial coordinates of points sources by fitting the centers to a sine curve in a transverse direction or a constant in the axial direction.

9. The method of claim 1, wherein processing comprises producing translational and rotational alignment errors by a least squared fit based on the gamma camera geometry.

10. A gamma camera system which can be compensated for errors in detector head translation and rotation comprising:

a plurality of detector heads defining a field-of-view;

a plurality of point sources positioned in the field-of-view;

a gantry which acts to move the detector heads to different detector head positions during acquisition of event data from the point sources;

an event data processor which acts to process the event data from the plurality of point sources to produce translational and rotational error information; and an image processor which acts to produce a gamma camera image compensated by the error information.

11. The gamma camera system of claim 10, wherein the plurality of point sources comprise three point sources.

12. The gamma camera system of claim 10, wherein the point sources are positioned such that no two point sources share the same transverse plane and no three sources share an oblique plane parallel to the axis of rotation.

13. The gamma camera system of claim 10, wherein the event data processor acts to produce translational and rotational error information for each of a plurality of different detector head positions.

14. The gamma camera system of claim 10, wherein the event data processor comprises a point source projection data processor.

15. The gamma camera system of claim 10, wherein the event data processor comprises a surface or curve fitting processor.

16. The gamma camera system of claim 10, wherein the event data processor comprises a processor which produces at least one of an axial direction error term and a tangential direction error term, and produce at least one of a tilt error term, an angle error term, or a twist error term.

* * * * *